(12) United States Patent
Hawkins

(10) Patent No.: US 11,686,289 B2
(45) Date of Patent: Jun. 27, 2023

(54) METHOD TO CONTROL THE OPERATIONAL STATUS OF A WIND TURBINE

(71) Applicant: Siemens Gamesa Renewable Energy A/S, Brande (DK)

(72) Inventor: Samuel H. Hawkins, Vejle (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 462 days.

(21) Appl. No.: 16/636,689

(22) PCT Filed: Aug. 3, 2018

(86) PCT No.: PCT/EP2018/071097
§ 371 (c)(1),
(2) Date: Feb. 5, 2020

(87) PCT Pub. No.: WO2019/030133
PCT Pub. Date: Feb. 14, 2019

(65) Prior Publication Data
US 2021/0148333 A1 May 20, 2021

(30) Foreign Application Priority Data
Aug. 7, 2017 (DE) .................... 10 2017 213 704.5

(51) Int. Cl.
*F03D 7/04* (2006.01)
*F03D 17/00* (2016.01)
(Continued)

(52) U.S. Cl.
CPC ............ *F03D 7/048* (2013.01); *F03D 17/00* (2016.05); *F03D 7/0224* (2013.01); *F03D 7/047* (2013.01);
(Continued)

(58) Field of Classification Search
CPC ........ F03D 7/048; F03D 17/00; F03D 7/0224; F03D 7/047; F03D 80/05; F05B 2240/95;
(Continued)

(56) References Cited

U.S. PATENT DOCUMENTS

| 7,138,961 B2 | 11/2006 | Sievert |
| 2002/0029097 A1 | 3/2002 | Pionzio, Jr. et al. |

(Continued)

FOREIGN PATENT DOCUMENTS

| WO | 2008025357 A1 | 3/2008 |
| WO | 2014114296 A1 | 7/2014 |

(Continued)

OTHER PUBLICATIONS

International Search Report & Written Opinion dated Oct. 26, 2018 for PCT/EP018/071097.
(Continued)

*Primary Examiner* — Joseph Ortega
(74) *Attorney, Agent, or Firm* — Schmeiser, Olsen & Watts LLP

(57) ABSTRACT

A method to control the operational status of a wind turbine is provided. An operator communication interface establishes a wireless point-to-point communication to a wind turbine communication interface. The wind turbine communication interface is an integrated part of the wind turbine. A control signal is transmitted from the operator communication interface via the point-to-point communication to the turbine communication interface. The control signal is transferred from the turbine communication interface to an internal control system of the wind turbine. The internal control system of the wind turbine changes the operational status of the wind turbine based on the control signal.

15 Claims, 5 Drawing Sheets

(51) Int. Cl.
*F03D 80/50* (2016.01)
*F03D 7/02* (2006.01)

(52) U.S. Cl.
CPC .......... *F03D 80/50* (2016.05); *F05B 2240/95* (2013.01); *F05B 2270/1033* (2013.01); *F05B 2270/327* (2013.01)

(58) Field of Classification Search
CPC ....... F05B 2270/1033; F05B 2270/327; Y02E 10/72; Y02E 10/727
See application file for complete search history.

(56) References Cited

U.S. PATENT DOCUMENTS

2009/0259429 A1   10/2009   Elisiussen
2011/0291853 A1   12/2011   Riesberg et al.

FOREIGN PATENT DOCUMENTS

WO   WO-2014114296 A1 *   7/2014   ............. F03D 17/00
WO   2015106764 A1   7/2015

OTHER PUBLICATIONS

Schaf Frederico M et al: "Small wind turbine communication system implementation"; 2015 International Conference on Smart Grid and Clean Energy Technologies (ICSGCE). IEEE, Oct. 20, 2015 (Oct. 20, 2015), pp. 159-163, XP032891751; DO1: 10.1109/ICSGCE.2015.7454289; ISBN: 978-1-4673-8732-3; 2015.

* cited by examiner

METHOD TO CONTROL THE OPERATIONAL STATUS OF A WIND TURBINE

CROSS-REFERENCE TO RELATED APPLICATIONS

This application claims priority to PCT Application No. PCT/EP2018/071097, having a filing date of Aug. 3, 2018, which is based on German Application No. 10 2017 213 704.5, having a filing date of Aug. 7, 2017, the entire contents both of which are hereby incorporated by reference.

FIELD OF TECHNOLOGY

The following relates to a method to control the operational status of a wind turbine.

BACKGROUND

Wind turbines need to be remote controlled by an operator for reaching a specific operational status, i.e.:
performing a power adjustment,
initiating a test proceeding,
repositioning of the nacelle by yawing,
repositioning of the blades by pitching,
repositioning of the rotor,
stop of the wind turbine or
start of the wind turbine,
etc.

Modern wind turbines are often connected to a respective remote operation and control center through a communication system, i.e. via the "Supervisory Command and Data Acquisition, SCADA" system.

This SCADA system is often combined and connected with the "world wide web" (internet) thus the operator, who may be located far away from the wind turbine site, has access for control purposes to a respective wind turbine.

There is often the need to manually control the operation of a given wind turbine of a wind farm—e.g. to stop a turbine to enable service personal entering the wind turbine for service work.

The remote controlled operation of wind turbines of an offshore wind farm is not that easy. There is the need to establish a stable internet/SCADA-connection with the remote operation and control center via suitable mobile communication equipment.

Establishing and maintaining the stable connection may be quite difficult as the requesting personal is located offshore in a harsh environment, comprising no or only limited access to dedicated, reliable mobile communication equipment.

The same applies to this situation: a remote operator needs to ensure that a given wind turbine is put out of operation if a large vessel approaches to the offshore wind turbine. To perform this approach safely, it is known to yaw the nacelle of the wind turbine so that the rotor is opposite from the direction of the approaching vessel. Finally, the rotor is brought to a defined standstill.

This situation is shown in FIG. 5, wherein a large vessel, acting as working-platform during wind turbine installation, is located in front of a wind turbine.

The vessel often has a poor internet/SCADA connection to carry out remote manual control of the wind turbine, thus it is difficult for the mobile vessel operator and for the crew to ensure that the wind turbine is safely stopped and positioned as described above.

Additionally, there is the problem that a quick reaction, which is needed to counteract a possible hazardous situation at the wind turbine site, needs to be possible. This is difficult, if not impossible, to ensure if the whole operation is controlled by a shore-based operator or over an unreliable internet/SCADA connection.

SUMMARY

An aspect relates to an improved method to control the operational status of a wind turbine, minimizing or even avoiding the problems described above.

According to embodiments of the invention an operator communication interface establishes a wireless point-to-point communication to a wind turbine communication interface. The wind turbine communication interface is an integrated part of the wind turbine.

A control signal is transmitted from the operator communication interface via the point-to-point communication to the wind turbine communication interface.

The control signal is transferred from the turbine communication interface to an internal control system of the wind turbine. The internal control system of the wind turbine changes the operational status of the wind turbine based on the control signal.

According to embodiments of the invention an operator, who is close to the site of the wind turbine, controls the operation of the wind turbine directly.

In one configuration the point-to-point communication is bidirectional and all data and information, being present in the wind turbine, could be transmitted to and displayed at the operator for his evaluation and information.

Thus, the operator communication interface is arranged close to the site of the wind turbine but beyond a safety distance between the operator communication interface and the wind turbine.

The control is established via a wireless point-to-point communication between the operator and the internal control system of the turbine.

The respective point-to-point communication is at least able to bridge a so called "hazard exclusion zone" of the wind turbine. Based on this the operator is always located outside the hazard exclusion zone for safety reasons.

For modern wind turbines a radius of this hazard exclusion zone depends on the blade length, i.e. in case that a vessel approaches the wind turbine.

For ice throw the radius of the hazard exclusion zone depends on rotor diameter and on the height of the hub of the wind turbine. The radius might be calculated according to this formula:

$$HazardRadius=(RotorDiameter+HubHeight)\times1.5$$

Thus, for modern wind turbines the point-to-point communication needs to bridge and overcome a distance of approximately 400 meters for example.

In one configuration the respective point-to-point communication is a so called "short range communication", according to the principles of Bluetooth or DECT or the like. Even communication according to Wi-Fi (IEEE 802.11), according to cellular-communication technologies (i.e. GSM, GPRS, EDGE, WCDMA, HSPA, LTE, etc.) or according to optical communication (i.e. FSO, IR laser, etc.) might be used for this purpose.

In one configuration the operator communication interface is part of an operator control device, which might be a handheld.

The operator control device might comprise a user interface, thus the operator communication interface is located close to the operator and his control device.

In another configuration the wind turbine communication interface is installed at the base of the wind turbine or at the nacelle. Thus, the operator can access the control system of the wind turbine at a safe distance from the turbine rotor and from any associated hazards.

A data communication link is established and maintained between the operator communication interface and the wind turbine communication interface.

In one configuration the wireless communication interface, located at the wind turbine, is directly connected with the internal control system of the wind turbine.

This internal control system of the wind turbine is responsible for executing a set of turbine commands, related to:
the operational status of the wind turbine (start operation/stop operation),
to the setting of power reference values,
to the setting of pitch- and yaw-values,
to control of the rotor motion,
to brake-commands,
etc.

In another configuration the handheld of the operator is able to carry out these actions:
establish a point-to-point wireless communication between operator and the internal control system of the wind turbine,
provide user authentication information,
establish an exclusive communication, comprising a higher priority than the wind turbine communication via Internet/SCADA (thus the exclusive communication overrules remote communication via SCADA and Internet),
send control commands to the control system of the wind turbine, in particular those ones which are necessary to put the turbine and its components in safe condition or position for an approach of personal towards the wind turbine, and
disconnect from the internal control system if desired by the operator.

In another configuration the wind turbine communication interface comprises an antenna capable of sending and receiving wireless signals.

For wind turbines with a steel tower or for a steel nacelle construction the antenna is located on the respective exterior. Thus, signal attenuation, caused by the steel structure, is avoided.

In another configuration the transmission protocol, used by the wireless communication, is capable of transmitting data at a sufficient bandwidth for turbine control commands. Thus, a quick execution of the respective control commands is ensured.

In another configuration the interfaces and the wireless communication use end-to-end encryption for the data being exchanged between the operator and the wind turbine. Thus, interception or collection of information by unauthorized users is prevented.

In another configuration the operator access is protected by a robust authorization system such as the "Remote Authentication Dial In User Service, RADIUS" protocol.

In another configuration the operator operates a wider functionality of the wind turbine via the point-to-point communication, thus he might have access to the same functions as the internal control panels of the wind turbine as well. Thus, the remote operator has the same control level as if he would be physically located within the wind turbine.

In another configuration the operator uses the wireless point-to-point communication for accessing even the SCADA network of the wind farm. Thus, the operator can control various wind turbines of the wind farm via the SCADA network.

In another configuration the operator communication interface is part of a computer, of a mobile device (phone or tablet), etc., thus joint functionalities can be used by the operator for control and data evaluation processes.

In another configuration the wind turbine communication interface as well as the respective antenna are not permanently installed and connected. They could be arranged in a removable manner thus the operator might control the wind turbine for testing purposes. In this case the operator wants to maintain direct control but staying at a secure location and outside of the wind turbine.

In another configuration an exclusive connection priority is established. Once the operator has assumed control of the wind turbine via the internal control system of the wind turbine an exclusive authority over control functions of the wind turbine is assigned to the operator control device (handheld, etc.) of the operator.

This authority establishes that the control is done by the local operator, preventing remote-connected or SCADA connected users or functionalities from issuing control commands.

In another configuration the operator control device monitors the signal quality of the point-to point communication via the respective interfaces constantly.

If the control device detects a weakening signal quality a warning signal will be initiated to alert the operator.

If the signal quality is insufficient for a secure control of the wind turbine the internal control system of the wind turbine will disable the exclusive authority of the operator control device. In turn the wind turbine control system will re-establish the remote control thus other users or functionalities gets access for control.

In another configuration the operator may disable the remote control connection of the wind turbine via the operator control device by a disable.

If the internal control system of the wind turbine receives a disable signal, being initiated by the operator control device and transmitted via the point-to-point communication, the internal control system will disable the remote control of the wind turbine and will assume a safe state of operation. This safe state of operation can include maintaining operation or discontinuing a manually commanded function such as manual control of the nacelle yaw positioning.

The internal control system of the wind turbine will return to the remote control if the on-site operator is no longer taking control, i.e. by a time-out or by an intended finish of work by the on-site operator or if the signal quality of respective control signals drop below a given signal quality level.

In another configuration specific safety functions are executed via the point-to-point-communication.

In another configuration the wireless-transmitted control signals or control commands of the operator initiates an emergency stop operation of the wind turbine. Thus, the operator control device comprises an emergency stop pushbutton. This button activates an internal emergency stop function of the wind turbine from distance.

This wireless emergency stop function would be implemented according to international standards on functional safety, i.e. including:
ISO 13849-1: Safety of machinery Safety-related parts of control systems, IEC 61508-1: Functional safety of electrical/electronic/programmable electronic safety-related systems, or
ISO 13850: Safety of machinery Emergency stop function.

In another configuration the control commands transmitted via the point-to-point communication are restricted to preset functions of the wind turbine.

Thus, the operator is only allowed sending a limited subset of control commands to the wind turbine i.e. stop operation commands or yaw positioning commands. Thus, only those functionalities, which are absolutely necessary for an on-site based and/or target-oriented control, might be included.

In another configuration the communication interface may also be used to receive information from the wind turbine. Thus, the communication may be bi-directional thus the operator control device receives information from the wind turbine and sends information and/or commands to the wind turbine as well.

Embodiments of the invention stop the operation of the wind turbine in a secure, reliable manner.

The stop operation process can be initiated, controlled and its progress can be recognized directly at the site.

Thus, (service-) personal can enter the wind turbine without any danger, especially if the (service-) personal is transferred by helicopter or by service vessel to the wind turbine.

According to embodiments of the invention rotating blades of the wind turbine are brought to a defined standstill. Thus, no ice will be dropped down from rotating blades of the wind turbine anymore. In turn approaching (service-) personal will not be endangered and harmed by ice anymore.

According to embodiments of the invention a local operator executes exclusive control of the wind turbine. Other, remote located staff has no control access to the wind turbine during this period of time thus safety during maintenance work and service work is improved.

If respective components of embodiments of the invention are implemented at each wind turbine of a wind farm a remote-control is ensured even if the SCADA network of the wind farm fails.

By using a short range communication, a geographic limitation in view to authorized access is implemented as well.

Nearby operators and developers of wind farms have significantly greater control over the wind turbines (both from large vessels offshore and from technicians approaching turbines onshore) during the installation and commissioning phase. Poor communications or lack of high speed internet access will no longer prohibit a safe access to the wind turbine. Installation costs are reduced, and annual energy production is increased by ensuring safe and effective access strategies.

BRIEF DESCRIPTION

Some of the embodiments will be described in detail, with reference to the following figures, wherein like designations denote like members, wherein.

DETAILED DESCRIPTION

Figure 1:
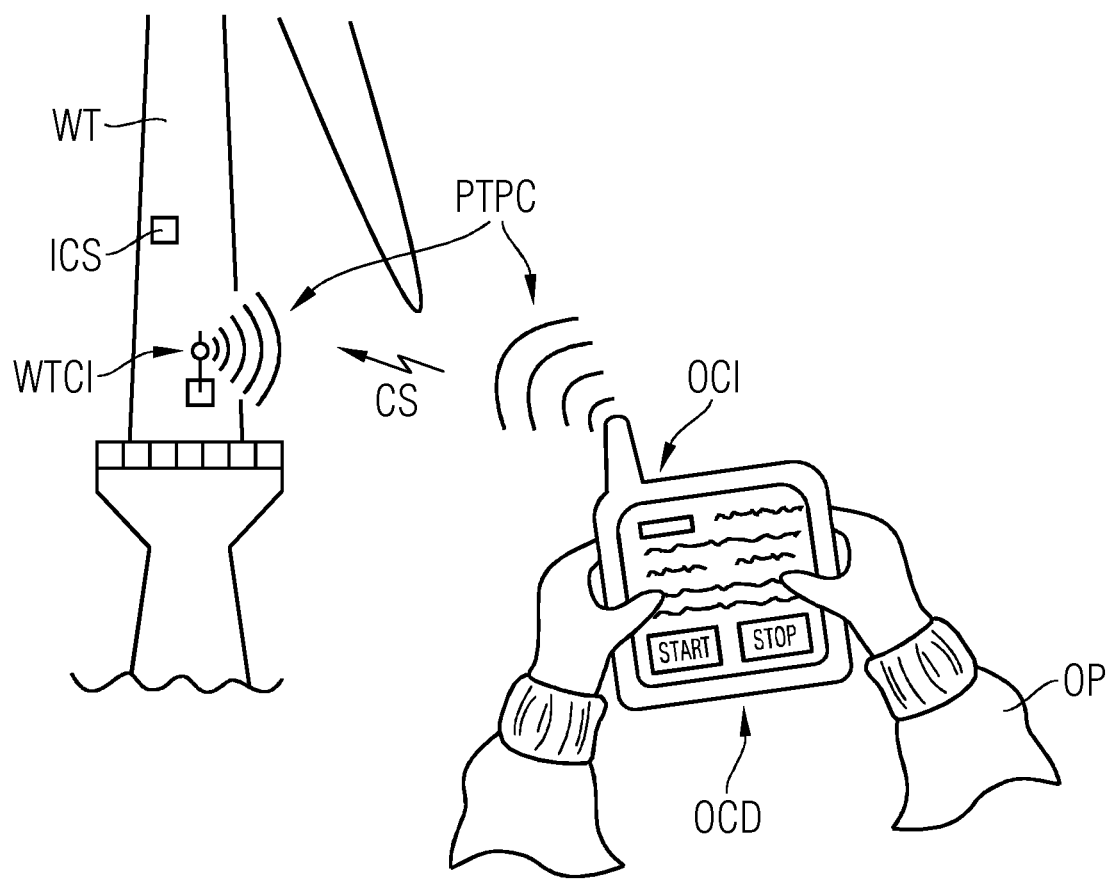
FIG. 1 shows a handheld communication device and a wind turbine, being part of the method invented.

FIG. 1 shows a handheld communication device and a wind turbine, being part of the method invented.

The operator control device OCD comprises an operator communication interface OCI, which establishes a wireless point-to-point communication PTPC to a wind turbine communication interface WTCI. The wind turbine communication interface WTCI is an integrated part of the wind turbine WT.

A control signal CS is transmitted from the operator communication interface OCI via the point-to-point communication PTPC to the wind turbine communication interface WTCI.

The control signal CS is transferred from the wind turbine communication interface WTCI to an internal control system ICS of the wind turbine WT.

The internal control system ICS of the wind turbine WT changes the operational status of the wind turbine WT based on the control signal CS.

Thus, an operator OP, who is close to the site of the wind turbine WT, can control the operation of the wind turbine WT directly.

Figure 2:
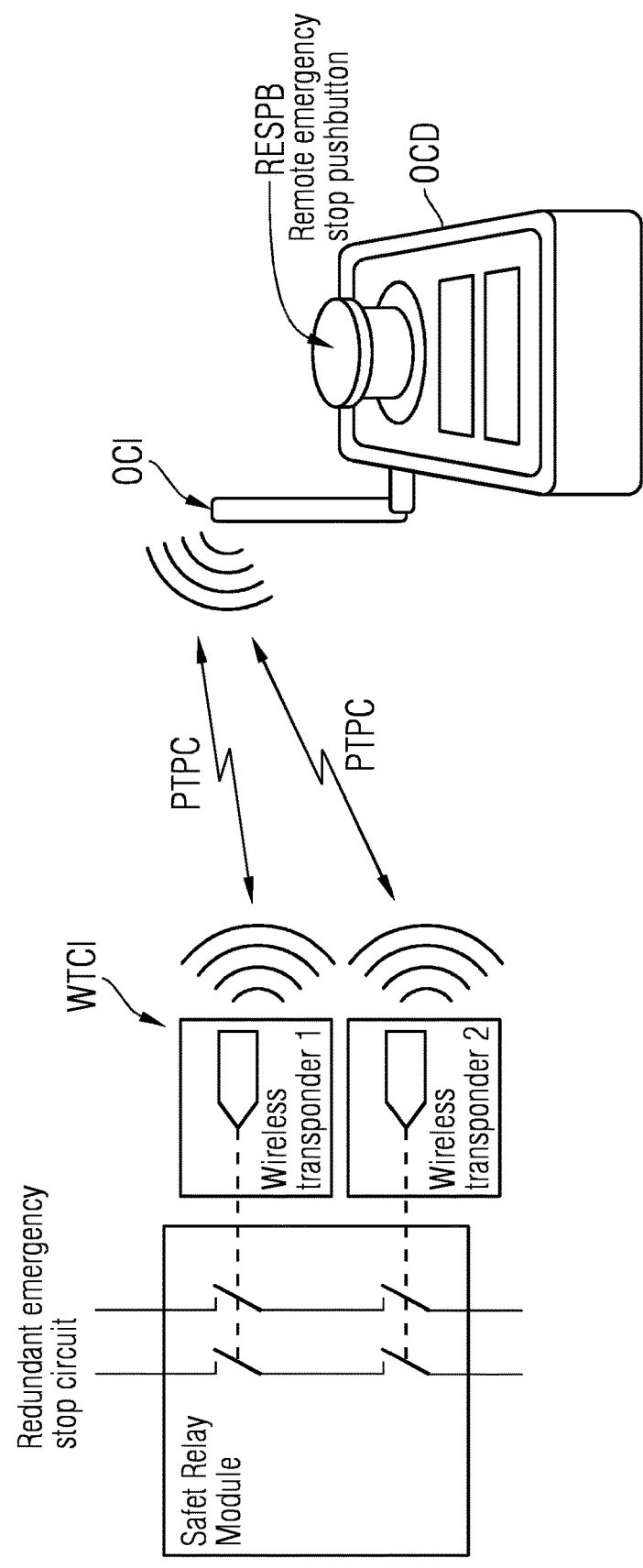
FIG. 2 shows a handheld communication device with a remote emergency stop pushbutton-functionality.

FIG. 2 shows a handheld communication device OCD with a remote emergency stop pushbutton RESPB for a remote emergency stop functionality.

Referring to FIG. 1 a point-to-point-communication PTPC is established between the wind turbine communication interface WTCI and the operator communication device OCD.

The wind turbine communication interface WTCI comprises two wireless transponders 1 and 2 for safety reasons. They are interconnected by help of a "safety relay module", which comprises a set of coupled switches. The switches are connected with a redundant emergency stop circuit.

Figure 3:
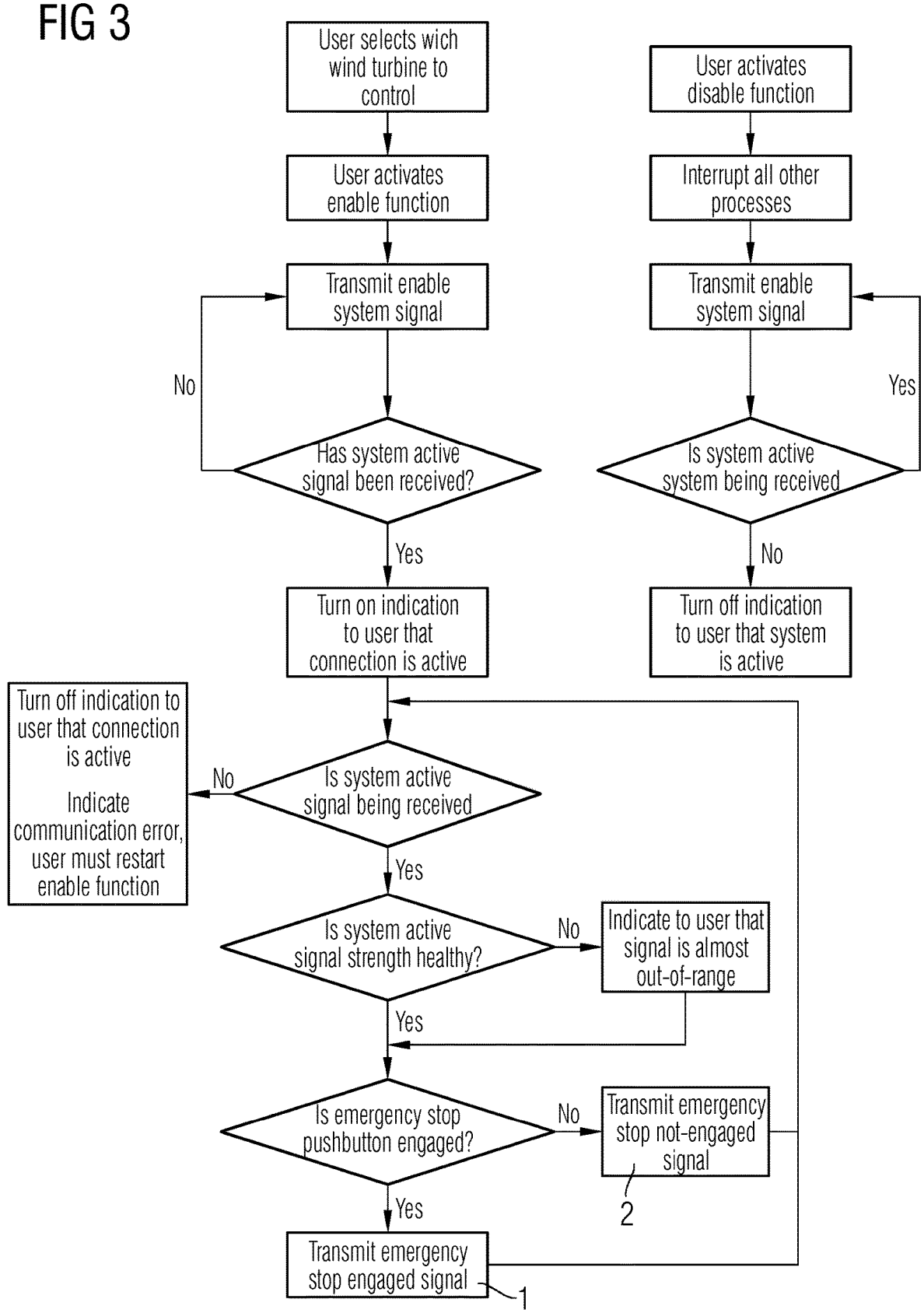
FIG. 3 shows a principle operational flow chart of a wireless emergency stop pushbutton communication in relation to FIG. 2.

FIG. 3 shows a principle operational flow chart of a wireless emergency stop pushbutton communication in relation to FIG. 2.

This operational strategy is in line with the functional safety requirements of an ISO 13849-1 PLD system. It is noted that the considerations regarding signal security and user authorization as described above might be included additionally in this concept.

Figure 4:
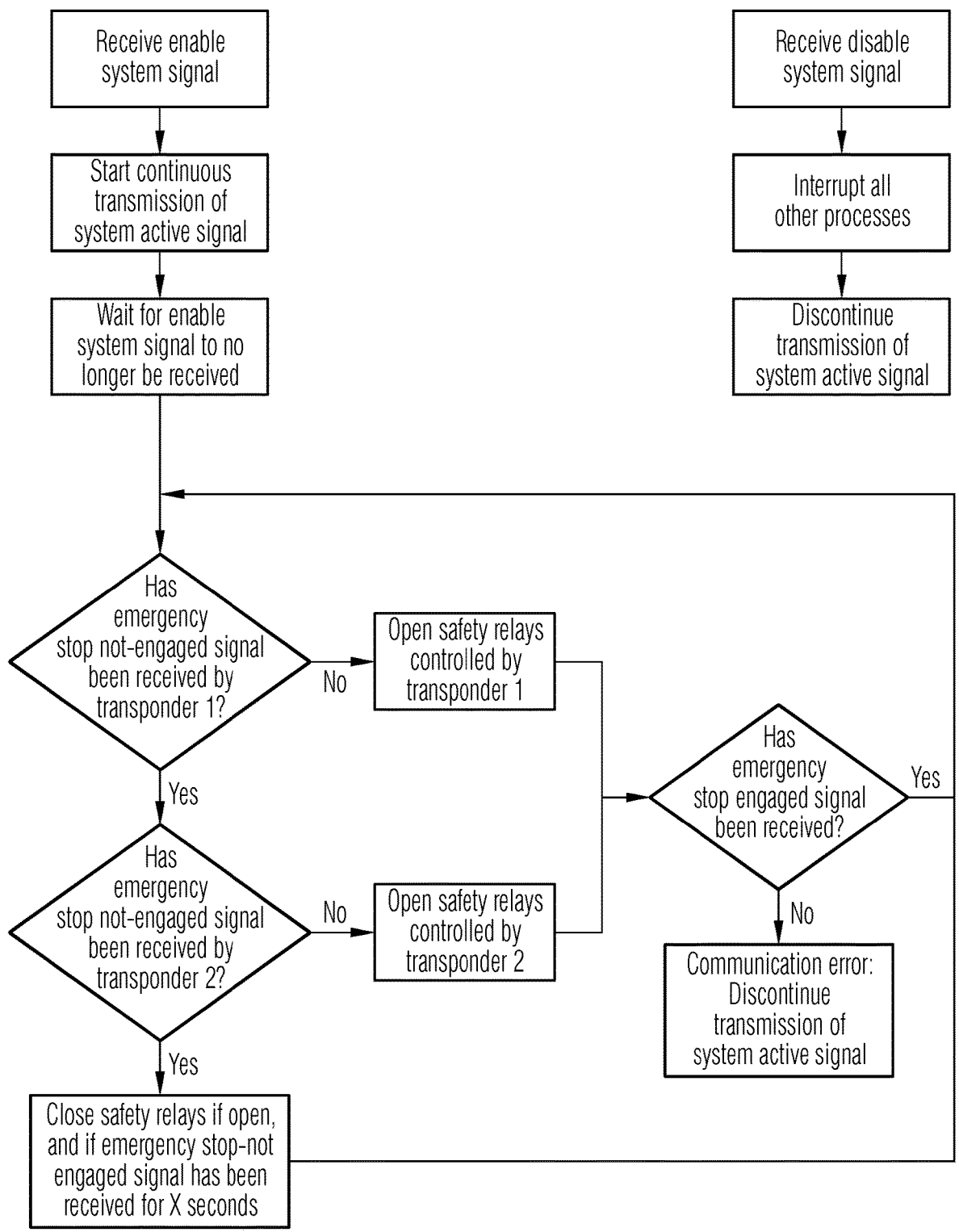
FIG. 4 shows a respective flow chart describing the operation of the safety relay module and wireless transponder located at the wind turbine in relation to of FIG. 2.
Figure 5:
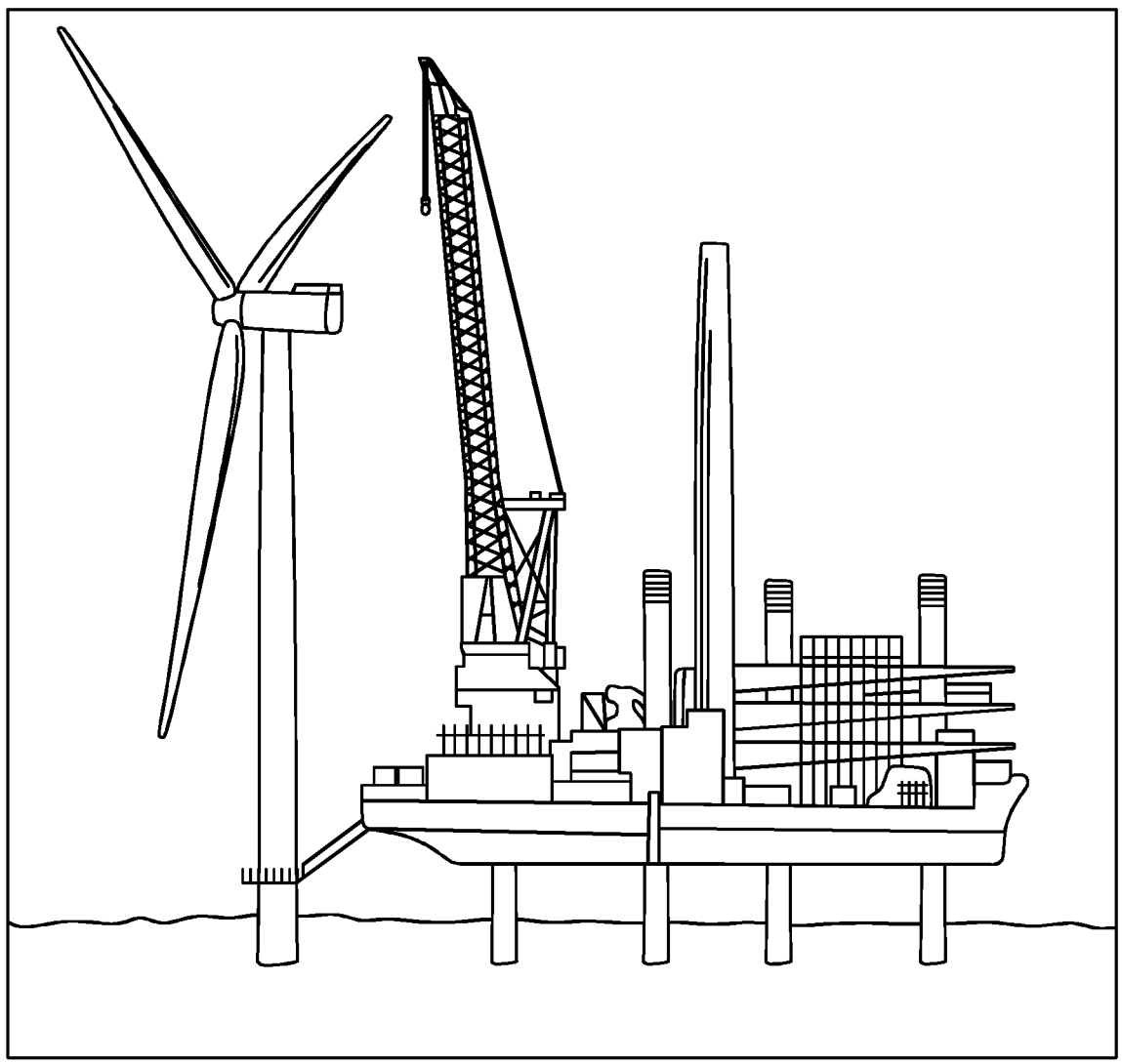
FIG. 5 shows a vessel, acting as a working-platform during a wind turbine installation, as described in the introduction above.

FIG. 4 shows a respective flow chart describing the operation of the safety relay module and wireless transponder located at the wind turbine in relation to FIG. 2 as well.

"Emergency Stop—enable functionality": The remote emergency stop pushbutton has an enable function which consists of transmitting a unique enable system signal to the wireless transponders located at the wind turbine.

There are two wireless transponders for purposes of redundancy. This enable system signal initializes the wireless transponders so that they will expect to receive further signals from the remote emergency stop button.

A system active signal will be transmitted back from the transponders to the emergency stop button and an indicator will make the user aware that a connection has been successfully established.

"Emergency Stop—signal communication": Following a successful enable function, the remote emergency stop pushbutton will begin transmitting a uniquely coded emergency stop not-engaged signal. It will continuously transmit this signal as long as it remains enabled and the emergency stop button is not engaged.

After a successful enable function, the wireless transponders will begin to receive the emergency stop not-engaged signal from the remote emergency stop pushbutton. The system active feedback signal will continue to be transmitted back to the remote emergency stop pushbutton.

The remote emergency stop pushbutton will receive this system active signal and an indicator will make the user aware that the emergency stop pushbutton is now in control of the wind turbine.

"Emergency Stop—function activation": When the remote emergency stop pushbutton RESPB is engaged, an emergency-stop-not-engaged signal transmission 2 will be stopped and an emergency stop engaged signal 1 will be transmitted.

The wireless transponders will respond immediately to the loss in the emergency-stop-not-engaged signal from the remote emergency stop pushbutton RESPB by releasing two relays, comprising the switches as described above in FIG. 2. These relays are normally open and are controlled by each transponder.

The transponders do not require a reception of the emergency-stop-engaged-signal to release the safety relays, they will even react if the emergency-stop-not-engaged-signal is lost.

When these relays transition from closed to open, an emergency stop circuit within the wind turbine is opened causing emergency stop-related actions to take place within the wind turbine. These actions can include bringing the turbine rotor to a standstill and removing power from pumps motors and fans.

"Emergency Stop—reset function": Reset of the emergency stop relays back into the closed position can be commanded by the remote emergency stop pushbutton RESPB. If the remote emergency stop pushbutton RESPB is reset to the disengaged position, then it will resume transmission of the emergency-stop-not-engaged signal.

When the wireless transponders receive the emergency-stop-not-engaged signal for a sufficient period of time, they will close the safety relays, restoring the wind turbine emergency stop circuit.

Even though the emergency stop circuit is resumed, restart of the wind turbine, or restoration of power to any pumps, fans, or motors will not resume until a user issues a command over a separate remote control system to restart. This ensures compliance with ISO 13850 guidelines which mandate that reset of an emergency stop should not automatically resume operation of the associated machinery.

"Warning for out-of-range": While the wireless transponders are enabled, they will continuously transmit a system active feedback signal. This feedback signal is received by the remote emergency stop button and evaluated for signal strength. If the signal strength of the feedback signal received by the remote emergency stop button drops below a pre-determined threshold then the user will be alerted that they are approaching the maximum range where it is possible to communicate without signal loss.

In the event that the user does surpass the maximum range then the wireless transponders will activate the emergency stop function due to a loss in the emergency stop not-engaged signal.

"Emergency Stop—disable function": When the user no longer intends to have remote emergency stop button control of the wind turbine, then they may activate a disable function. When this function is activated the remote emergency stop button will transmit a unique disable system signal.

When the wireless transponders at the wind turbine receive the disable system signal, they will no longer react to a loss in the emergency stop not-engaged signal or expect to receive further signals from the remote emergency stop button. The safety relays will then remain in the closed state, unless power is removed from the wireless transponders.

The disable system signal is the only signal which can be received by the wireless transponders when the system is active, other than the emergency stop not-engaged signal, and not cause an activation of the wind turbines emergency stop circuit.

The wireless transponders will discontinue transmitting the system active signal and the remote emergency stop button will indicate to the user that a connection is no longer established. If the safety relays controlled by the wireless transponders are in the open state when the disable system signal is received, then they will remain in that state.

Although the present invention has been disclosed in the form of preferred embodiments and variations thereon, it will be understood that numerous additional modifications and variations could be made thereto without departing from the scope of the intention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method, comprising:
   providing a wind turbine having an integrated wind turbine communication interface, wherein the wind turbine is controlled by a first control signal via a first communication, and wherein the first communication is via Internet/SCADA,
   receiving a second communication from an operator communication interface, wherein the second communication is a remote wireless point-to-point direct communication to the wind turbine communication interface, wherein the remote wireless point-to-point direct communication is a short range communication implemented according to the principles of Bluetooth or DECT or WiFi, or an extended range communication, implemented according to the principles of GSM or GPRS or EDGE or WCDMA or HSPA or LTE, or an optical communication,
   wherein the remote wireless point-to-point direct communication is not a connection via Internet/SCADA, and wherein the second communication comprises a second control signal transmitted from the operator communication interface to the wind turbine communication interface,
   transferring the second control signal from the wind turbine communication interface to an internal control system of the wind turbine, and
   changing the operational status of the wind turbine based on the second control signal, wherein the second control signal received via the second communication overrides the first control signal received via the first communication.

2. The method according to claim 1, wherein the operator communication interface is arranged close to the site of the wind turbine but beyond a safety distance between the operator communication interface and the wind turbine.

3. The method according to claim 2, wherein the range of the remote wireless point-to-point direct communication is greater than the safety distance.

4. The method according to claim 1, wherein the first control signal and the second control signal, which are received via the wind turbine communication interface, are directly transmitted to the internal control system of the wind turbine.

5. The method according to claim 4, wherein the internal control system of the wind turbine executes a set of turbine commands related to:
- the operational status of the wind turbine (start operation/stop operation), or
- to the setting of power reference values, or
- to the setting of pitch- and yaw-values, or
- to control of the rotor motion, or
- to brake-commands.

6. The method according to claim 1, wherein the operator communication interface generates the second control signal based on an interaction with an operator, while the operator communication interface is part of a handheld device, which even comprises a user interface for interaction with the operator.

7. The method according to claim 6, wherein the handheld communication device of the operator carries out these actions:
- establish a point-to-point wireless communication between operator and the internal control system of the wind turbine,
- provide user authentication information,
- send control commands to the control system of the wind turbine, and
- disconnect from internal control system if desired by the operator.

8. The method according to claim 1, wherein a radius of a hazard exclusion zone is used as safety distance.

9. The method according to claim 1, wherein a data communication link is established and maintained between the operator communication interface and the wind turbine communication interface.

10. The method according to claim 1, wherein the operator communication interface, the wind turbine communication interface and the remote wireless point-to-point direct communication use an end-to-end encryption for the data being exchanged.

11. The method according to claim 1, wherein the access of the operator to the control system is protected by an authorization system.

12. The method according to claim 1, wherein the remote wireless point-to-point direct communication is used for an emergency stop operation functionality, being initiated and established by an operator via the operator communication interface.

13. The method according to claim 1, wherein data and information, which are present in the wind turbine, are transmitted from the wind turbine communication interface via the remote wireless point-to-point direct communication to the operator communication interface, thus the data and information are displayed at an operator for evaluation and information.

14. A method to control an operational status of a wind turbine, comprising:
providing a wind turbine communication interface, wherein the wind turbine communication interface is an integrated part of the wind turbine and includes two wireless transponders, wherein the two wireless transponders are connected to respective coupled switches of a safety relay module, wherein the safety relay module is connected to a redundant emergency stop circuit of the wind turbine, wherein the wind turbine is controlled by a first control signal via a first communication, and wherein the first communication is via Internet/SCADA;
establishing a second communication, wherein the second communication is a remote wireless point-to-point direct communication between the wind turbine communication interface and an operator communication interface;
receiving a second control signal from the operator communication interface via the second communication; and
activating the redundant emergency stop circuit of the wind turbine based on the second control signal, wherein activating the redundant emergency stop circuit of the wind turbine based on the second control signal overrides the first control signal.

15. A wind turbine comprising:
a wind turbine communication interface having two wireless transponders, wherein the two wireless transponders are connected to respective coupled switches of a safety relay module, wherein the safety relay module is connected to a redundant emergency stop circuit;
wherein the wind turbine is controlled by a first control signal via a first communication, and wherein the first communication is via Internet/SCADA;
wherein the two wireless transponders are configured to establish a second communication, wherein the second communication is a remote wireless point-to-point direct communication with a remote operator communication interface, receive a second control signal from the remote operator communication interface via the second communication, and activate the redundant emergency stop circuit based on the second control signal;
wherein, the redundant emergency stop circuit activated based on the second control signal has a higher priority than the first control signal received via the first communication and the redundant emergency stop circuit activated based on the second control signal overrules the first control signal received via the first communication.

* * * * *